United States Patent [19]

Mori

[11] 4,419,981

[45] Dec. 13, 1983

[54] SUN TRACKING APPARATUS

[76] Inventor: Kei Mori, 3-16-3-501, Kaminoge, Setagaya-ku, Tokyo, Japan

[21] Appl. No.: 393,386

[22] Filed: Jun. 29, 1982

[30] Foreign Application Priority Data

Jul. 1, 1981 [JP] Japan .................... 56-103600

[51] Int. Cl.³ .................................... F24J 3/02
[52] U.S. Cl. .................................. 126/425; 126/440; 250/203 R; 353/3
[58] Field of Search ............... 126/424, 425, 440; 250/203 R, 291; 353/3

[56] References Cited

U.S. PATENT DOCUMENTS

| 4,146,784 | 3/1979 | Yekutieli | 126/425 |
| 4,179,612 | 12/1979 | Smith | 126/425 |
| 4,225,781 | 9/1980 | Hammons | 250/203 R |
| 4,226,502 | 10/1980 | Gunzler | 126/425 |
| 4,227,513 | 10/1980 | Blake | 126/425 |
| 4,276,122 | 6/1981 | Snyder | 126/440 |
| 4,332,238 | 6/1982 | Garcia | 126/425 |
| 4,340,812 | 7/1982 | Mori | 250/203 R |
| 4,343,295 | 8/1982 | Dubicki | 126/440 |
| 4,367,403 | 1/1983 | Miller | 250/203 R |
| 4,368,962 | 1/1983 | Hultberg | 353/3 |

Primary Examiner—Daniel J. O'Connor
Attorney, Agent, or Firm—Merchant, Gould, Smith, Edell, Welter & Schmidt

[57] ABSTRACT

A sun tracking apparatus comprises a first pair of photosensors arranged at symmetrically opposed positions on a first horizontal axis rotatable around a third vertical axis, and a second pair of photosensors arranged at symmetrically opposed positions on a second axis perpendicular to and rotatable around the first axis. To the first and third axes are connected driving means which operate when there are differences in outputs between the first pair of photosensors and between the second pair of photosensors, respectively.

10 Claims, 5 Drawing Figures

SUN TRACKING APPARATUS

The present invention relates to an apparatus for concentrating and collecting solar light energy for many uses, more particularly to an automatic sun tracking apparatus for moving lens means to follow the seasonal, daily, and hourly changes in the sun's azimuth and altitude, so that the lens means continually faces the sun and effectively collects solar light energy.

Various kinds of solar light energy utilizing equipment and devices with lens means for collecting solar light energy are known. Such solar light energy utilizing equipment or devices must be able to effectively collect the largest amount of solar light energy possible. In order to collect the largest amount of the solar light energy possible, it is necessary for the lens means to always face the sun. The sun, however, changes in location and angle seasonally, daily, and hourly. Therefore, the lens means must be continuously moved to follow the sun.

Hitherto unknown has been a solar energy collecting apparatus having a simple sun tracking apparatus which can continuously and precisely follow such seasonal, daily, and hourly changes in the sun's location and altitude.

The primary object of the present invention is, therefore, to provide a simple sun tracking apparatus which ensures that the solar energy collecting apparatus always faces the sun and which can be easily and inexpensively manufactured.

The sun tracking apparatus of the present invention has a possible minumum number of optical detectors for detecting the sun's location. Preferably, the optical detectors comprise two pairs of photosensors or photocells arranged at opposing points along two perpendicular axes. The first pair of photosensors or photocells is substantially arranged at two ends of a first axis rotatable around a third axis orthogonal to the first exis and the grounds. The photosensors have substantially vertical parallel outer sunlight receiving surfaces which face outside.

The second pair of photosensors or photocells is substantially arranged at two ends of a second axis perpendicular to and rotatable around the first axis. The photosensors have substantially parallel inner sunlight receiving surfaces which face inside.

The first axis is rotated around the third axis by a first drive means in accordance with outputs of the first pair of photosensors. The second axis is rotated around the first axis by a second drive means in accordance with outputs of the second pair of photosensors. The first and second drive means operate only when there are differences in outputs between the first pair of photosensors and between the second pair of photosensors, respectively.

A fifth optical detector which has an outer sunlight receiving surface substantially parallel to the plane defined by the first and second axis may be provided to detect the total amount of the sunlight. The output of one of the second pair of photosensors may be modified in accordance with the sun's location.

Other features, additional objects, and many of the attendant advantages of this invention will readily be appreciated through the following detailed description of preferred embodiments with reference to the appended drawings, in which.

Figure 1:
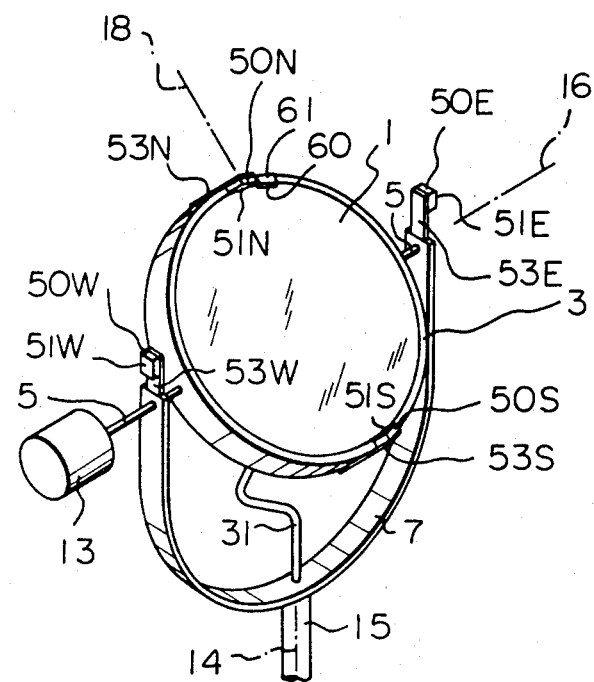
FIG. 1 is a schematic perspective view of a sun tracking apparatus according to the present invention.
Figure 2:
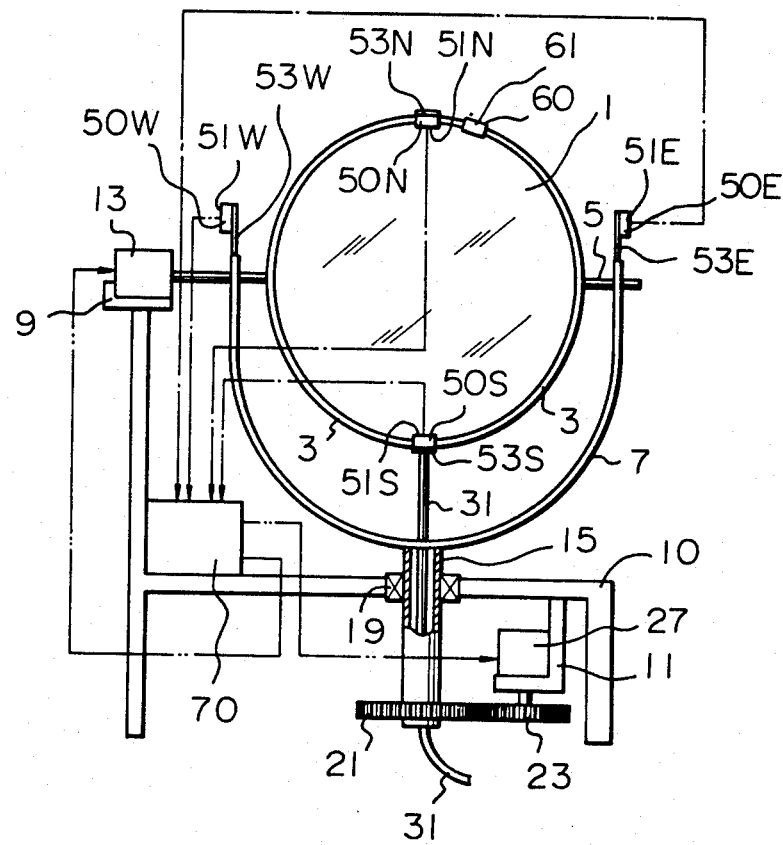
FIG. 2 is a front elevational view of the apparatus illustrated in FIG. 1, shown at a different position.

The apparatus of this invention has a rotatable vertical shaft 15 substantially orthogonal to the ground, i.e., lying along the above-mentioned third axis 14. The vertical shaft 15 supports a generally U-shaped arm 7 arranged symmetrical to the shaft.

The apparatus also has a horizontal shaft 5 perpendicular to the axis of vertical shaft 15, i.e., lying along the above-mentioned first axis 16. The horizontal shaft 5 supports therebetween a circular ring frame 3, arranged symmetrical to the shaft, and is rotatably supported by the arm 7. An optical lens means, preferably composed of a circular Fresnel lens 1, is supported by and held in the ring frame 3.

The vertical shaft 15 is rotatably supported on a base frame 10 by means of a bearing 19. The vertical shaft 15 has a gear wheel 21 integral therewith which is engaged with a gear wheel 23 which is, in turn, connected to a first driving motor 27. The first motor 27 can be supported, for example, by a bracket 11 integral with the base frame 10. The first motor 27 rotates the verical shaft 15 together with the arm 7.

To one end of the horizontal shaft 5 is connnected a second driving motor 13 which is supported by a bracket 9 integral with base frame 10. The second motor 13 rotates the horizontal shaft 5 together with the ring frame 3.

Figure 3:
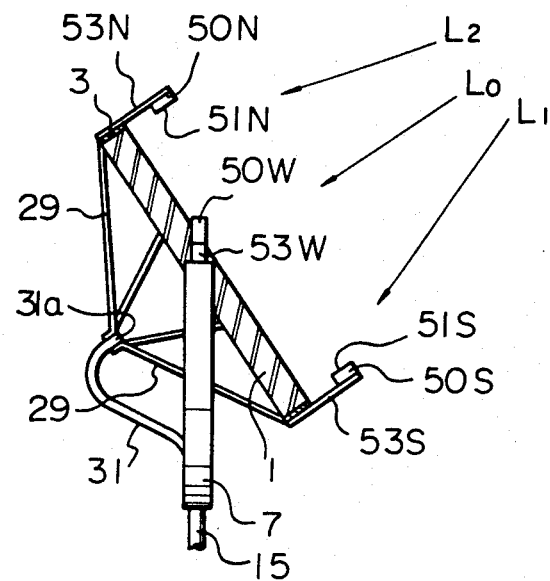
FIG. 3 is a side elevational view of FIG. 1.

The ring frame 3 has supporting frames 29 (FIG. 3) which are secured thereto and which generally form an inverted imaginary cone. The bottom apex of the imaginary cone defined by the supporting frames 29 is located at the focus point of the Fresnel lens 1. An inlet end 31a of an optical fiber cable 31 is located at and connected to the bottom apex of the imaginary cone of the supporting frames 29. The sunlight collected by the lens 1 is collected by the cable 31. The vertical shaft 15 is preferably hollow, so that the cable 31 extending through the arm 7 can extend in the vertical shaft 15 to a solar energy utilizing device (not shown).

Four optical detectors, such as photosensors (or photocells) 50E, 50W, 50N, and 50S are provided to detect the amount of sunlight. These photosensors, which are themselves known, issue electrical outputs when they receive sunlight and feed the outputs to a central processing unit (CPU) 70 on the base frame 10. In the position of the lens 1 shown in FIG. 1, the photosensors 50E, 50W, 50N, and 50S are located at the four cardinal point, i.e. east, west, north, and south, respectively. Accordingly, they are represented by the suffixes E. W, N, and S for convenience's sake. It should be, however, noted that the location of the photosensors changes in accordance with the azimuth and altitude of the sun, as will be described hereinafter.

The first pair of photsensors 50E and 50W are held by and secured to vertical plates 53E and 53W, respectively, which are in turn secured to the ends of the arm 7. The photosensors 50E and 50W are located at diametrically opposed positions substantially on the axis of the horizontal shaft 5. The photosensors 50E and 50W have substantially vertical outer sunlight receiving surfaces 51E and 51W, respectively, facing outside in opposite directions.

The second pair of photosensors 50N and 50S are held by and secured to vertical plates 53N and 53W, respectively, which are in turn secured to the peripheral surface of the ring frame 3. The photosensors 50N and 50S are located at diametrically opposed positions substantially on an axis perpendicular to the horizontal shaft 5, i.e., substantially on the above-mentioned second axis 18. The photosensors 50N and 50S have substantially vertical inner sunlight receiving surfaces 51N and 51S, respectively, which face inside.

A fifth optical detector, such as photosensor (or photocell) 60 is also provided on the ring frame 3. The fifth photosensor 60 has an upper sunlight receiving surface 61 substantially parallel to the plane of the lens 1. The sunlight receiving surface 61 faces the sun when the lens 1 faces the sun. The fifth photosensor 60 detects the presence or absence of sunlight and effects the sun tracking operation, described later, only when there is sunlight and stops the sun tracking operation when there is no sunlight, for example, at night.

The apparatus of this invention operates as follows. In the discussion to follow, the movement of the lens is described in reference to installation sites in the northern hemisphere.

When the lens 1 precisely faces the sun that is, when sunlight is received in a direction $L_0$ (FIG. 3) perpendicular to the plane of the lens 1, none of the photosensors 50E, 50W, 50N, or 50s receive direct sunlight since their sunlight receiving surfaces are all parallel to the direct sunlight. In this state, (referred to below as the "desired position"), these photosensors only receive minor indirect sunlight, i.e., diffused light.

On the other hand, when the lens 1 is deviated from the desired position and does not precisely face the sun, that is, when direct sunlight is received in directions not perpendicular to the plane of the lens, certain of the photosensors 50E, 50W, 50N, or 50S will receive direct sunlight.

For example, when the direct sunlight is received at an angle from the third axis in the plane defined by the third axis and second axis, the photosensor 50S will receive direct sunlight in directions $L_1$ (FIG. 3), while the photosensor 50N will not, or the photosensor 50N will receive direct sunlight in direction $L_2$, while photosensor 50S will not.

Figure 4:
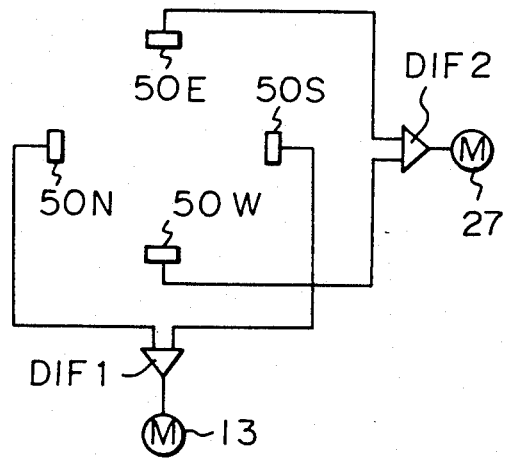
FIG. 4 is a diagram of an example of a drive circuit operating in accordance with differential outputs of the photosensors.

The CPU 70 has a differential amplifier DIF1 (FIG. 4) which compares the outputs of the photosensors 50N and 50S. When there is a difference between said outputs, it drives the second motor 13 in a predetermined direction until that difference is eliminated. When the direct sunlight is received at an angle from the third axis, in the plane defined by the third axis and the first axis, the same situation occurs. The CPU 70 also has a differential amplifier DIF 2 which compares the outputs of the photosensors 50E and 50W. When there is a difference between said outputs, it drives the first motor 27 in a predetermined direction until that difference is eliminated.

As can be understood from the above, the apparatus according to the present invention can therefore track the daily, hourly and seasonal movement of the sun to keep the lens continuously and directly facing the sun, thus allowing effective collection of solar light energy.

Figure 5:
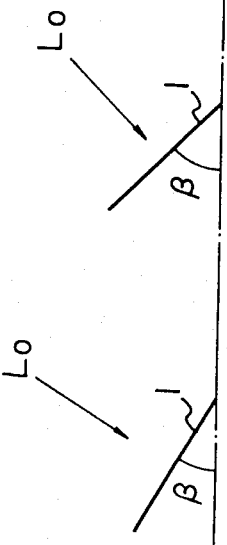
FIG. 5 is a schematic view showing successive positions of the plane defined by the first and second axis which follows the movement of the sun.

The movement of the lens 1 as it follows the sun is schematically shown in FIG. 5. In FIG. 5, only rotation of the horizontal shaft 5 is shown. In FIG. 5, direct sunlight falls along the direction $L_0$. The direction $L_0$ changes from a 75° altitude $\theta$ just after high noon to a 15° altitude $\theta$ near sunset.

It should be noted that the total quantity $Q_0$ of sunlight is the sum of the quantity $Q_1$ of direct sunlight and the quantity $Q_2$ of indirect sunlight (indirect spacious rays). That is, $$Q_0 = Q_1 + Q_2$$

Most indirect sunlight, as is well known is prependicular to the ground or at only slight angles to the line perpendicular to the ground independent of the location of the sun.

Now, when the altitude $\theta$ of the sun is small, as at about sunset (or sunrise), the angle $\beta$ of the incline of the lens 1 is large. Also at sunset (or sunrise), however, the quantity of indirect sunlight falling from above is large while the quantity of indirect sunlight rising from below is small. In such a position, there is a large difference between the quantity of indirect sunlight received by the photosensors 50S and 50N. That is, the quantity of the indirect spacious rays which the photosensor 50S receives is considerably larger than that received by the photosensor 50N. The quantity of the indirect sunlight which the photosensor 50N receives is very small, almost zero, when the angle $\beta$ of incline of the lens 1 is almost 90°.

This creates problems particularly at about sunset or sunrise. If the motor 13 were to rotate until the output of the photosensor 50N became equal to the output of the photosensor 50S at that time, the lens would go past the desired position. As obvious from the above explanation, this is because the output of the photosensor 50S is larger than the output of the photosensor 50N by a value corresponding to the difference in the quantity of the indirect sunlight received by the photosensors 50N and 50S even when the lens directly faces the sun.

The difference between the amount of the indirect sunlight received by the photosensors 50N and 50S increases as the inclined angle $\beta$ of the lens 1 increases. The following table shows experimental findings on the relationship between the altitude $\theta$ of the sun and the ratio between the total quantities $Q_N$ and $Q_S$ of the sunlight received by the photosensors 50N and 50S, respectively. In the experiments, the lens was positioned to directly face the sun, that is, the sum of the altitude $\theta$ of the sun and the inclined angle $\beta$ of the lens 1 was always 90° ($\theta$ is a complementary angle of $\beta$).

| $\theta$ | $Q_S/Q_N$ |
|---|---|
| $\theta = 20°$ | 2.1 |
| ($\beta = 70°$) | |
| $\theta = 30°$ | 1.9 |
| ($\beta = 60°$) | |
| $\theta = 40°$ | 1.6 |
| ($\beta = 50°$) | |
| $\theta = 50°$ | 1.4 |
| ($\beta = 40°$) | |
| $\theta = 60°$ | 1.2 |
| ($\beta = 30°$) | |
| $\theta = 70°$ | 1.1 |
| ($\beta = 20°$) | |

As can be seen from the above table, in spite of the fact that the lens 1 precisely faced the sun, there was a difference between $Q_S$ and $Q_N$. That is, $Q_N$ was always smaller than $Q_S$ ($Q_S > Q_N$). The difference increased as the angle $\beta$ increased. As mentioned above, the difference results from the difference in the amount of indirect sunlight received by the photosensors 50N and 50S.

In order to prevent the CPU 70 from moving the lens 1 past the desired position, it is necessary to compensate for this difference. The simplest solution is to multiply the output of the photosensor 50S by an adjusting coefficient $\lambda$ which is a reciprocal number of the ratio and which is a function of the altitude $\theta$ of the sun or the inclined angle $\beta$ of the lens 1. By multiplying $Q_S$ by a reciprocal number of $Q_S/Q_N$, the multiplied $Q_S$ ($Q_S/\lambda$) becomes equal to $Q_N$, so that the movement of the lens 1 can be stopped just at the desired position. The multiplication operation can be effected in the CPU 70.

If no highly precise adjustment of the inclined angle of the lens following the movement of the sun is necessary, no adjustment of the output of the photosensor 50S by multiplying it by the adjusting coefficient $\lambda$ is necessary. Furthermore, if no highly precise adjustment of the inclined angle of the lens is necessary, the sunlight receiving surfaces of the two pairs of photosensors may be slightly inclined with respect to the incident direct sunlight when the lens is put in the desired position.

Alternatively, it is also possible to control the movement of the lens 1 in such a way that the output of the photosensor 50S is multiplied by the adjusting coefficient $\lambda$ only when the total amount $Q_S$ of the sunlight received by the photosensor 50S is larger than the total amount $Q_C$ of sunlight received by the photosensor 60. This is because $Q_C$, which is usually larger than $Q_S$ in the daytime, is smaller than $Q_S$ at about sunset or sunrise. This is because of sunset or sunrise, on the one hand, the direct sunlight received by the photosensor 60 is small and, on the other hand, the indirect sunlight received by the photosensor 50S is large. In the above-mentioned alternative method, the motor 13 is controlled in such a way that lens 1 rotates until $|Q_S - Q_N| = 0$ under the condition of $Q_C > Q_S$ and until $|Q_S/\lambda - Q_N| = 0$ under the condition of $Q_C \leq Q_S$.

I claim:

1. A sun tracking apparatus comprising a rotatable vertical shaft, a horizontal shaft which is rotatably supported by the vertical shaft and whose axis is orthogonal to the axis of the vertical shaft, a first pair of optical detectors which are supported by the vertical shaft at symmetrically opposed positions substantially on the axis of the horizontal shaft, said optical detectors having substantially vertical outer sunlight receiving surfaces which face outside in opposite directions to one another, a second pair of optical detectors which are supported by the horizontal shaft, so as to rotate therewith, at symmetrically opposed positions substantially on an axis perpendicular to the horizontal axis, said second pair of optical detectors having substantially parallel inner sunlight receiving surfaces facing each other, a first driving means connected to the vertical shaft for rotating the same in a predetermined direction in accordance with outputs of the first pair of optical detectors, and a second driving means connected to the horizontal shaft for rotating the horizontal shaft in a predetermined direction in accordance with outputs of the second pair of optical detectors, said first and second driving means being driven only when there are differences in outputs between the first pair of optical detectors and between the second pair of optical detectors, respectively.

2. An apparatus according to claim 1, wherein each of said optical detectors comprises a photosensor which detects the amount of sunlight.

3. An apparatus according to claim 2, further comprising a lens means for collecting sunlight, supported by the horizontal shaft.

4. An apparatus according to claim 3, wherein said lens means comprises a circular Fresnel lens.

5. An apparatus according to claim 3, further comprising an optical fiber cable which has an inlet end located at a focal point of the lens means.

6. An apparatus according to claim 4, further comprising a ring frame which holds therein the Fresnel lens and which is supported by the horizontal shaft so as to ratate therewith.

7. An apparatus according to claim 6, wherein said second pair of photosensors are located on the ring frame in a diametral arrangement so that a diametral line connecting the second pair of photosensors is normal to the axis of the horizontal shaft.

8. An apparatus according to claim 6, further comprising a fifth optical detector which is supported on the ring frame and which has an upper sunlight receiving surface substantially parallel to the plane of the lens to detect the total amount of the sunlight.

9. An apparatus according to claim 8, further comprising means for modifying the output of one of the second pair of photosensors in accordance with an altitude of the sun.

10. An apparatus according to claim 8, further comprising means for modifying the output of one of the second pair of photosensors only when the ouput of said one photosensor is larger than the output of the fifth optical photosensor.

* * * * *

UNITED STATES PATENT AND TRADEMARK OFFICE
CERTIFICATE OF CORRECTION

PATENT NO. : 4,419,981

DATED : December 13, 1983

INVENTOR(S) : Kei Mori

It is certified that error appears in the above-identified patent and that said Letters Patent is hereby corrected as shown below:

Column 1, line 33, "minumum" should be --minimum--;

Column 1, line 39, "exis" should be --axis--;

Column 2, line 31, "verical" should be --vertical--;

Column 4, lines 14 & 15, "prependicular" should be --perpendicular--;

Column 6, line 31, "ratate" should be --rotate--.

Signed and Sealed this

Twelfth Day of June 1984

[SEAL]

Attest:

GERALD J. MOSSINGHOFF

Attesting Officer

Commissioner of Patents and Trademarks